3,187,797
PNEUMATIC TIRES
Henry Raymond Fletcher, Birmingham, and William Neil Weils, Lichfield, England, assignors to Dunlop Rubber Company Limited, London County, England, a British company
Filed Nov. 27, 1963, Ser. No. 326,571
Claims priority, application Great Britain, May 25, 1963, 20,978/63
15 Claims. (Cl. 152—154)

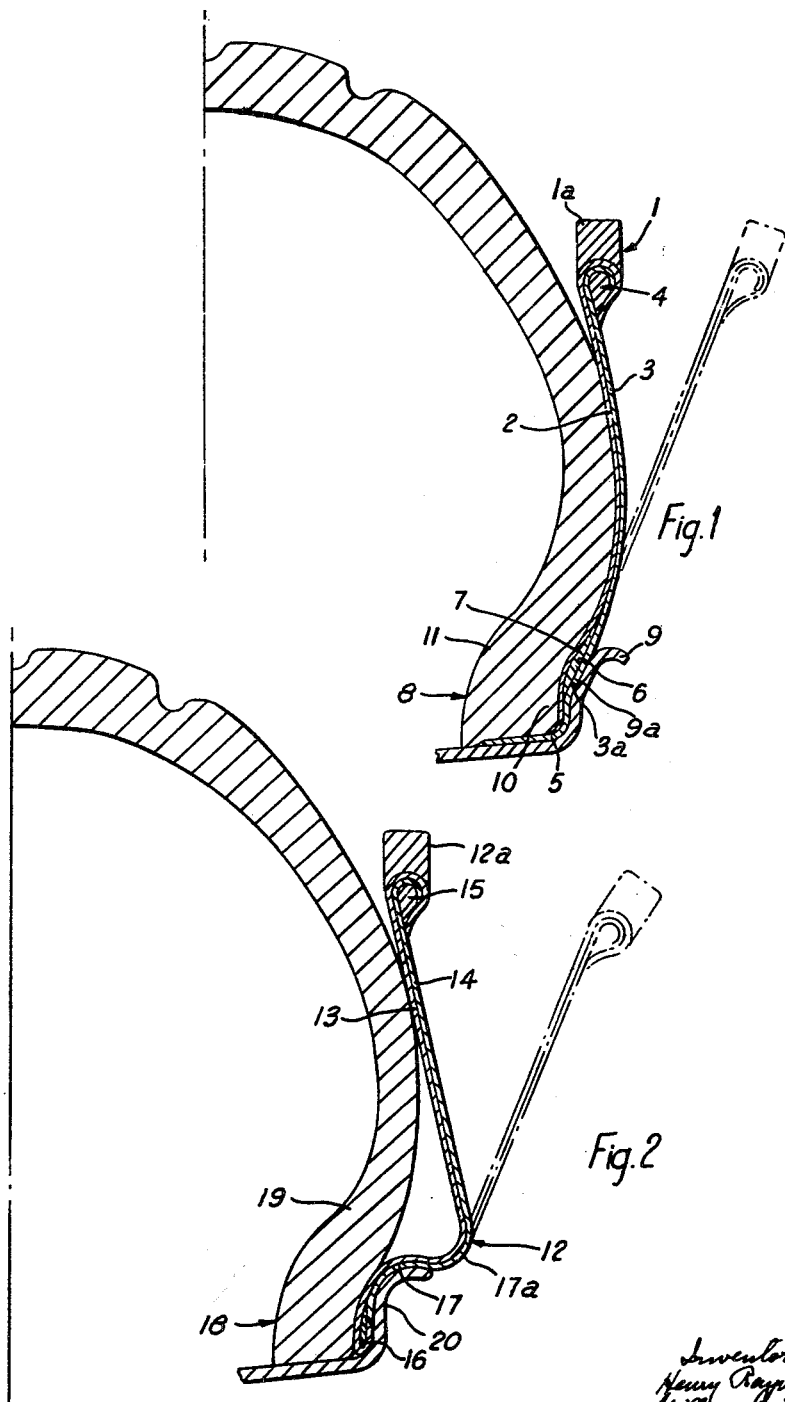

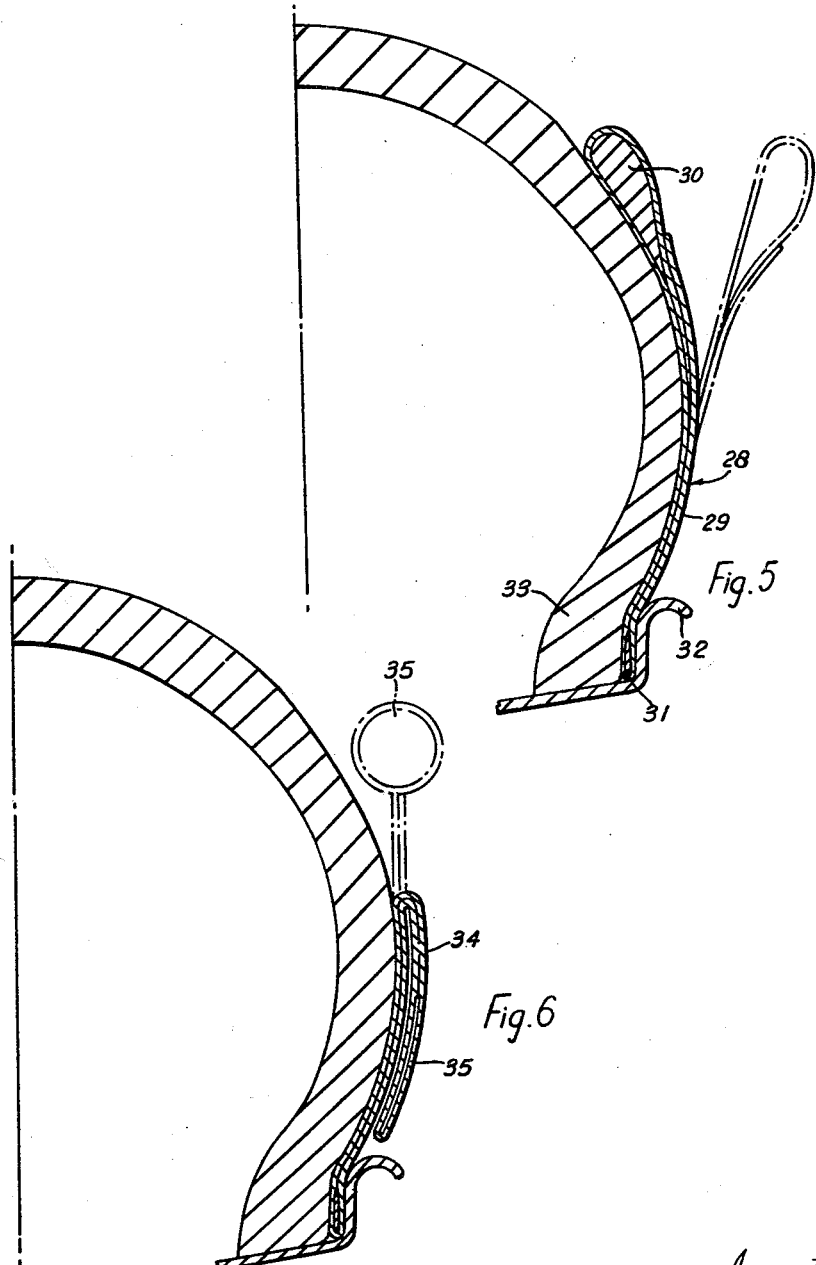

This invention relates to pneumatic tires and in particular to pneumatic tires incorporating water deflecting annuli.

Inadvertent flame-out of aircraft jet engines has been experienced in the past, either on take-off or on landing, by the ingestion of water into the engine air intakes thrown up by tires running through standing water on the landing strip of an aerodrome. Such an event can cause a serious accident to happen to the aircraft with consequent danger to life.

It is an object of the present invention to provide means and also to provide a pneumatic tire having means for either eliminating this danger or considerably reducing it.

According to the invention, a pneumatic tire is provided with a water-deflecting annulus which is stiffened at one periphery and is locatable in a stowed position wherein it is disposed in contact with or in close relationship with respect to the tire sidewall when the tire is in the unloaded condition, the stiffened periphery and a portion of the annulus extending radially away from said periphery being movable axially outwardly from the stowed position to a water-deflecting position of the annulus during rotation of the loaded tire or during passage of the rotating loaded tire through standing water on the ground.

Preferably, the annulus does not contact the ground under normal loading conditions of the tire.

In one preferred construction, the annulus is constructed from two layers of fabric, each of which is substantially inextensible in a radial direction, the radially inner regions of the annulus being provided for gripping between a tire and a flange of a wheel rim to which the tire is to be fitted. A resilient annular rib is sandwiched between the two layers of material, the layer of material nearest the tire having an annular bulge extending around the rib and the other layer of material being of planar form in the region of the rib, so that when assembled upon a wheel rim, the rib is positioned so as to be compressed between the tire and a wheel rim flange upon deflection of the part of the tire radially inwardly of the ground-contacting regions, such compression causing axial outward deflection of the ungripped portions of the annulus.

In another preferred construction, the radially outermost portion of the annulus is located nearer the mid-circumferential plane of the tire than a radially inner portion thereof when the tire is in an unloaded condition, the outer periphery and a portion of the annulus radially outwardly of said inner portion being movable to a water-deflecting position as aforesaid.

The annulus may be reinforced throughout with filamentary material, e.g., steel wire cord in the form of weftless fabric, the stiffened periphery of the annulus being formed by a substantially inextensible bead which may be an integral ring of hard rubber of 85° to 95° Shore Hardness, or by an integral annular annular inflatable tube.

Embodiments of the invention will now be described, by way of example, with reference to the accompanying drawings in which:

FIGURE 1 is an axial cross-sectional view of part of a pneumatic tire and wheel assembly, the tire forming one embodiment to the invention and incorporating a water-deflecting annulus shown in full outline in stowed position and in dotted outline in a water deflecting position;

FIGURES 2 to 7 are views similar to FIGURE 1 of other embodiments of the invention.

Figure 3:
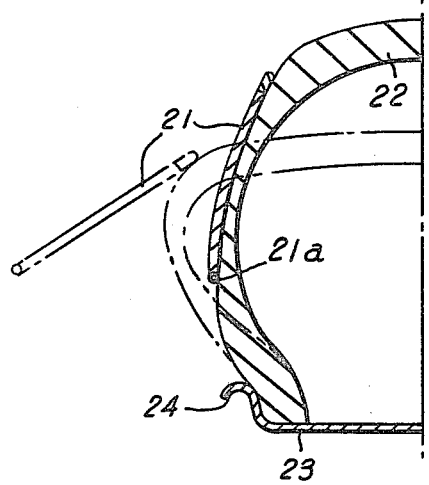

In a first embodiment of the invention shown in FIGURE 1, a substantially disc-shaped water-deflecting annulus 1 is constructed from two layers 2 and 3 of rubberised parallel steel cord fabric in the form of an annulus, the radially outer ends of the layers 2 and 3 being turned around a stiffening in the form of a bead 4 of hard rubber of 90° Shore Hardness located around the outer periphery of the annulus. Disposed around the annulus is a strip 1a of abrasion resistant material formed from natural rubber.

The steel cord in each layer extends at 45° to a circumferential line of the annulus in the radially outermost regions of the annulus, the cords in one layer extending in the opposite direction from those in the other layer.

The radially inner end 5 of the layer 3 extends in an axial direction and has an internal diameter such that it will lie around the rim of a wheel to which it is to be fitted. The radially inner end of the layer 2 terminates short of, but adjacent to, the radially inner end of the layer 3.

An annular rubber deflecting rib 6 is provided in a radially inner region of the annulus, the rib being sandwiched between the two layers of steel cords, the layer 3 being of planar form in the region 3a of the rib and the layer 2 having an annular bulge 7 cause by the sandwiched rib.

The profile of the annulus, in axial cross-section, is in close conformity with the profile of the tire alongside which it is to be fitted so that in the stowed position (shown in full outline), i.e. when located in the undercarriage bay of the aircraft, the annulus takes up little room additional to that taken up by the inflated tire alongside which it is fitted. In addition, the outer diameter of the annulus is such that during use and under normal loading conditions of the tire, the annulus lies close to, but not in contact with the ground. If, however, there is a sudden impact load on the tire, the wear resistant strip 1a of the annulus touches the ground.

When detachably fitted to a tire and wheel assembly 8 as shown in FIGURE 1, the radially inner regions of the annulus are sandwiched between a wheel rim flange 9 and a bead region 10 of the tire 11, and the end 5 of the layer 3 is gripped between the base of the bead region and the wheel rim. In addition, the rubber rib 6 is disposed between the tire and wheel rim flange in a position such that the planar formed region 3a of the layer 3 lies upon a portion 9a of the flange which is flat in axial cross-section as shown in FIGURE 1, the bulged layer 2 of steel cord adjacent to the deflecting rib being located nearest the tire. In the unloaded condition of the tire, the rubber rib 6 is in an uncompressed condition and the bulge 7 of the layer 2 lies in engagement with the tire.

During rotation of the tire, the ground-contacting tread portion of the tire is deflected radially inwardly, resulting in axially outward deflection in the portions of the sidewalls of the tire radially inwardly of the ground-contacting tread portion. This axial outward movement compresses a portion of the rubber deflecting rib between the tire and the flange of the wheel rim and tends to flatten the bulge in the layer 2 of cord. As the annulus is substantially inextensible in a radial direction, this compression causes the bulged cord layer to deflect the annulus axially outwardly from the side wall of the tire in the region of the compression. The annulus thus assumes a water-deflecting position as shown in dotted outline in FIGURE 1.

This is caused by the fact that the compressible rubber rib allows relative shearing action to take place, in this region of the rib but not in the region displaced therefrom, between the steel cords of the two layers, the bulged steel cords tending to straighten and since they are of greater length in the region of the bulge than the adjacent cords of the other layer, the composite layer must form a curve with the cords which tend to straighten, lying adjacent to the outer periphery of the curve.

In the deflected water-deflecting position of the annulus (dotted outline position) water which is splashed upwardly from beneath the tire during the passage of the tire through standing water on the ground, is splashed against the deflected portion of the annulus which deflects the water downwardly so as to avoid it being thrown up into the air intakes of the jet engines with which the aircraft is fitted.

In a second embodiment as shown in FIGURE 2, a detachable water-deflecting annulus 12 is constructed from two layers 13 and 14 of steel cord fabric as described in the first embodiment, the layers of fabric extending around a rubber bead 15 of 90° Shore Hardness at the outer periphery of the annulus. An abrasion resistant strip 12a of natural rubber is disposed around the annulus to protect the annulus against wear if it contacts the ground under an impact load after fitting to a tire and wheel assembly.

A bead 16 of rubberised convolutions of wire, the convolutions of which are arranged radially outwardly of one another, is located at the inner periphery of the annulus and is sandwiched between the two steel cord layers.

The internal diameter of the annulus is substantially equal to the internal diameter of the bead portions of an aircraft tire in conjunction with which it is to be used.

A radially inner portion 17 of the annulus in crosssection is shaped so that, when fitted to a tire and wheel assembly 18, as shown in FIGURE 2, with the bead 16 gripped between the bead of the tire 19 and the bead seating flange 20 of the wheel rim, it conforms to the outer peripheral surface of the flange, said inner portion extending axially and radially outwardly for engagement with the radially outermost portion of the flange. As shown in FIGURE 2, the annulus is constructed so as to be axially spaced-apart, in the axially outer part 17a of its radially inner portion 17, from the sidewall of the unloaded tire 19 and so as progressively to approach the sidewall of the tire until the annulus and the sidewall are in contact. The radially outermost portion of the annulus is located axially nearer the mid-circumferential plane of the tire than the part 17a of the annulus.

When located in the undercarriage bay of an aircraft, and with the annulus is a stowed position shown in full outline, the annulus and tire take up very little room additional to that taken up by a tire not provided with an annulus.

The outer diameter of the annulus is such that during use and under normal loading conditions of the tire, the annulus lies close to, but not in contact with, the ground.

In use, during rotation of the tire and the passage of the tire through standing water on the ground, the annulus pivots axially outwardly about the part 17a into a radially extending position under centrifugal force, water splashing from beneath the tire then forcing the annulus further axially outwardly into a water-deflecting position (shown in dotted outline). At no time during its outward movement does the annulus engage the ground as radially outward movement of the annulus is restrained by the inextensible nature of the stiffening provided at its outer periphery. In its water-deflecting position, the radially outermost portion of the annulus is disposed near the ground and in such an axially outward position that water from beneath the tire and immediately in front of the ground-contacting portion of the tire is splashed against the water deflecting annulus of the tire which deflects the water downwardly so as to avoid it being thrown up into air intakes of the jet engines with which the aircraft is fitted.

In a third embodiment shown in FIGURE 3, an annulus 21, which is constructed from two layers of steel cord, has an outer diameter which is equal to the shoulder diameter of a tire 22 of which it is fitted, the annulus being vulcanised around its radially outermost region to a shoulder of the tire. The inner periphery of the annulus is stiffened by a rubber bead 21a of 90° Shore Hardness, around which the steel cord layers are wrapped. The annulus extends partly down the tire sidewall and terminates short of the bead region so that when fitted to a wheel rim 23, the annulus lies wholly radially outwardly of the bead seating flange 24 of the rim.

In the unloaded and inflated state of the tire, the annulus lies in a stowed position in engagement with the tire sidewall as shown in the full outline position of FIGURE 3. However, during use, the shoulder regions of the tire, in addition to the tread regions, are deflected in the ground-contacting regions of the tire as shown in dotted outline, the angle subtended between the shoulders and the ground thereby being changed. This results in the axially outward pivoting into the water deflecting position (shown in dotted outline) of the portion of the annulus in these deflected regions, the annulus pivoting about the point at which it merges with the shoulder of the tire. In this position, water splashed from beneath the tire is deflected downwardly by the surface of the annulus facing the ground, i.e. the surface of the annulus remote from the tire sidewall.

Figure 4:
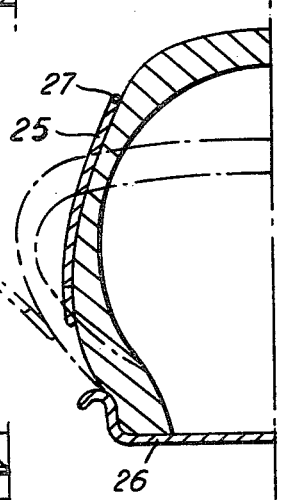

In a fourth embodiment shown in FIGURE 4, an annulus 25 extends from the shoulder region of a tire 26 partly down the sidewall in a manner similar to that of the annulus of FIGURE 3. The annulus 25 is also constructed in a manner similar to that described in respect of FIGURE 3, except that in this present case, the annulus is secured to the sidewall of the tire at its inner periphery and the outer periphery is stiffened with a rubber bead 27 of 90° Shore Hardness.

In the unloaded and inflated state of the tire, the annulus lies in a stowed position in engagement with the sidewall (shown in the full outline position). During use, the sidewalls of the tire are deflected in the ground contacting regions of the tire, as shown in dotted outline, so that the angle subtended between a tangent, to the portion of the sidewall to which the annulus is secured, and the ground is changed. This results in the axially outward pivoting into the water deflecting position (shown in dotted outline) of the portion of the annulus in these deflected regions. In this position, water splashed from beneath the tire is deflected downwardly by the undersurface of the annulus.

In a fifth embodiment shown in FIGURE 5, an annulus 28 is constructed from two layers of rubberised steel cord fabric. The layers are formed from a single length 29 of fabric which extends around hard rubber beads 30 and 31 of 90° Shore Hardness, the beads being located, respectively, one as a stiffening at the outer periphery of the annulus and the other at the inner periphery thereof, the ends of the length 29 overlapping adjacent the outer periphery of the annulus. The angular disposition of the steel cords in the plies is approximately 30° with respect to a circumferential line at the radially outermost portions of the annulus, this angle changing to approximately 60° at the radially innermost portions thereof.

The internal diameter of the bead 31 is substantially equal to the internal diameter of the bead portions of a high speed aircraft tire in conjunction with which the annulus is to be used.

At the extreme outer periphery of the annulus, which, during use upon a tire and wheel assembly, contacts the ground, there is provided means to resist wear of the annulus, said means comprising a strip or small blocks (not shown) of abrasion resistant material, the small blocks being spaced-apart circumferentially. The strip or small blocks are formed from suitably compounded polymeric material, such as natural rubber or polybutadiene, or a strip of material having a low coefficient of friction with respect to the ground surfaces with which it is likely to come into contact, e.g., polytetrafluoroethylene.

When detachably mounted upon a tire wheel assembly as shown in FIGURE 5, with the bead 31 gripped between the bead seating flange 32 of the wheel rim and the bead region 33 of the tire, the profile of the annulus, in cross-section, is in close conformity with the profile of the tire alongside which it is to be fitted so that in the stowed position (shown in full outline in FIGURE 5) i.e. when located in the undercarriage bay of the aircraft, the annulus takes up very little room additional to that taken up by the inflated tire alongside which it is fitted.

The external diameter of the annulus is such that when the tire to which it is fitted is loaded and in engagement with the ground, the outer periphery of the annulus engages the ground in the region of the deflected ground-contacting area of the loaded tire.

In operation, during rotation of the tire, the annulus is stiffened by the action of centrifugal force tending to throw it radially outwardly to a position spaced slightly from the tire. When the tire passes through standing water on the ground the annulus is caused, by the force of the water splashed out from beneath the tire, acting against the annulus, to move axially outwardly into a water-deflecting position (the dotted line position of FIGURE 5), so that the water is splashed outwardly of the tire against the water-deflecting annulus and is deflected downwards thereby as in the previous embodiments.

As the tire and water-deflecting annulus rotate, a different portion of the annulus is deflected and this occurs progressively during rotation so that there is always a deflected portion of the annulus alongside the ground-contacting area of the tire to which it is fitted.

In a sixth embodiment shown in FIGURE 6, an annulus 34 is constructed in a manner similar to that described in respect of FIGURE 5, except that in place of the ring 30 of hard rubber, the annulus is provided at its outer periphery with an annular inflatable tube 35 reinforced by means of a pair of plies of oppositely biased cords. When the tube is fully inflated, it forms a stiffened portion at the outer periphery of the annulus after the manner of the ring 30 of the last preceding embodiment, the cords, at the outer periphery of the tube extending at approximately 30° to a circumferential line crossing the cords. The annulus is constructed and moulded so that when the tube is deflated it is folded back upon the annulus and projects towards the bead and assumes a stowed position shown in full outline in FIGURE 6. When it is inflated it unfolds, the cross-section of the tube decreasing and its circumference increasing. By controlling the degree of inflation of the tube, the outer peripheral limit of radial expansion of the tube can be controlled so that it projects, in relation to the tread of the tire alongside which it is fitted by the required amount. The position of the annulus in the fully inflated position of the tube is shown in the dotted outline in FIGURE 6.

The extreme outer periphery of the tube portion of the annulus can be provided, as in the construction of FIGURE 5, with a strip or small blocks of abrasion resistant material.

The fact that the tube, in the uninflated state, lies folded against the remainder of the annulus results in little room being taken by the annulus in the stowed position and thus the annulus can easily be accommodated in the undercarriage bay of an aircraft.

Figure 7:
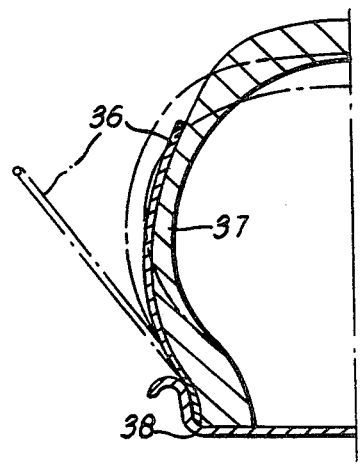

In a seventh embodiment shown in FIGURE 7, an annulus 36 is constructed in a manner similar to the annuli shown in FIGURES 5 or 6 except that, in this case, when detachably mounted between a tire 37 and wheel rim 38, the annulus does not touch the ground. The tire is constructed in such a manner that when a region of the tread is deflected radially inwardly upon contacting the ground, the lower sidewall regions radially inwardly of the ground contacting area are deflected axially outwards to force the annulus into a water deflecting position (dotted outline of FIGURE 7).

While the water deflecting annuli have been described manufactured with steel cord reinforcement, in modifications of each of the above embodiments, textile reinforcements are used.

Having now described our invention, what we claim is:

1. A pneumatic tire having a pair of sidewalls and provided with a water-deflecting annulus comprising at least two side-by-side layers of steel cord fabric, the cords in each layer lying in side-by-side relationship and extending in a radially outward direction of the annulus at a bias angle to a circumferential line of the annulus, the bias angle of the cords in one layer being of opposite sense, with respect to said circumferential line, to the angle of the cords in the other layer, the annulus also comprising a stiffening at one periphery and being locatable in a stowed position wherein it is disposed in contact with or in close relationship with respect to the tire sidewall when the tire is in the unloaded condition, the stiffened periphery and a portion of the annulus extending radially away from said periphery being movable axially outwardly from the stowed position to a water deflecting position of the annulus during rotation of the loaded tire or during passage of the rotating loaded tire through standing water on the ground.

2. A tire according to claim 1 wherein the annulus does not contact the ground under normal static loading conditions and under normal inflationary pressure of the tire.

3. A tire according to claim 1 wherein under normal loading conditions of the tire, the annulus contacts the ground and wherein the annulus is provided, around its outer peripheral surface, with wear resistant means.

4. A tire according to claim 1 wherein the radially inner regions of the annulus are positioned for gripping between the tire and a flange of a wheel rim to which the tire is to be fitted, and a resilient annular rib is provided in said radially inner region of the annulus, said rib being sandwiched between the two layers of steel cord fabric, the layer of steel cord fabric nearest the tire having an annular bulge extending around the rib and the other layer of steel cord fabric being of planar form in the region of the rib, so that, when assembled upon a wheel rim, the rib is positioned so as to be compressed between the tire and a wheel rim flange upon deflection of the part of the tire radially inwardly of the ground-contacting region, such compression causing axially outward deflection of the ungripped portions of the annulus.

5. A tire according to claim 1 wherein the radially outermost portion of the annulus is located nearer the mid-circumferential plane of the tire than a radially inner portion thereof when the tire is in an unloaded condition and the annulus lies in its stowed position, the outer periphery and a portion of the annulus radially outwardly of said inner portion being movable to a water deflecting position.

6. A tire according to claim 5 wherein said radially inner portion of the annulus is located adjacent to the inner peripheral surface of the annulus.

7. A tire according to claim 1 wherein the annulus is detachable from the tire.

8. A tire according to claim 1 wherein the annulus is secured by one annular portion to the tire and when the tire is fitted to a wheel rim, the annulus lies wholly radially outwardly of the bead seating flange of the rim, deflection of the tire in the ground-contacting regions causing pivotal movement of the annulus, about the point at which it is secured to the tire, from the stowed position to the water deflecting position.

9. A tire according to claim 1 wherein the stiffening at one periphery of the annulus is a substantially inextensible bead.

10. A tire according to claim 9 wherein the substantially inextensible bead is made from hard rubber having a Shore Hardness within the range 85 to 95°.

11. A tire according to claim 1 wherein said stiffening comprises a closed annular inflatable tube which upon inflation of the tube, stiffens the periphery of the annulus.

12. A tire according to claim 11 wherein the inflatable tube is formed from a reinforcement of oppositely biased cords and in a stowed position of the annulus, and when the tube is in a deflated condition, is folded back upon the annulus and projects towards the radially inner periphery thereof.

13. A water-deflecting annulus for use with a pneumatic tire for location between the rim of a wheel and the bead of a tire mounted on the wheel the annulus comprising at least two side-by-side layers of steel cord fabric, the cords in each layer lying in side-by-side relationship and extending in a radially outward direction of the annulus at a bias angle to a circumferential line of the annulus, the bias angle of the cords in one layer being of opposite sense, with respect to said circumferential line, to the angle of the cords in the other layer.

14. A water-deflecting annulus according to claim 13 provided with a stiffened outer periphery.

15. A pneumatic tire having a pair of sidewalls and provided with a water-deflecting annulus comprising at least two side-by-side layers of steel cord fabric, the cords in each layer lying in side-by-side parallel relationship and extending in a radially outward direction of the annulus at a bias angle to a circumferential line of the annulus, the bias angle of the cords of one layer being of opposite sense, with respect to said circumferential line, to the angle of the cords in the other layer, the annulus being locatable in a stowed position wherein it is disposed in contact with or in close relationship with respect to a tire sidewall when the tire is in the unloaded condition, a periphery and a portion of the annulus extending radially away from said periphery being movable axially outwardly from the stowed position to a water deflecting position of the annulus during rotation of the loaded tire or during passage of the rotating loaded tire through standing water on the ground.

References Cited by the Examiner
UNITED STATES PATENTS

| | | | |
|---|---|---|---|
| 1,616,115 | 2/27 | Delange | 152—154 X |
| 1,905,674 | 4/33 | Babbs | 152—154 X |
| 2,017,891 | 10/35 | Briggs | 152—154 X |

ARTHUR L. LA POINT, *Primary Examiner.*